United States Patent Office 3,658,843
Patented Apr. 25, 1972

3,658,843
AMIDES AND IMIDES OF FLUORINATED ALKYL-AMINES AND MALEIC AND OTHER ETHYL-ENICALLY UNSATURATED DIBASIC ACIDS AND POLYMERS THEREOF
Eduard Karl Kleiner, New York, N.Y., assignor to Ciba-Geigy Corporation
No Drawing. Filed Apr. 30, 1969, Ser. No. 820,647
Int. Cl. C07d 27/18; C07c 103/56
U.S. Cl. 260—326.5 FM     5 Claims

ABSTRACT OF THE DISCLOSURE

Monomeric amides of fluorinated alkylamines and fumaric, maleic, citraconic, mesaconic and itaconic acids; and monomeric imides of such fluorinated alkylamines and maleic, citraconic and itaconic acids form homopolymers and copolymers with other ethylenically unsaturated comonomers. The polymers obtained have valuable soil repellent properties which are especially useful in textile finishes. Preferred compounds exemplified are N-1,1-dihydroperfluorooctylmaleimide and bis(N-1,1-dihydroperfluorooctyl)itaconamide.

THE INVENTION

This invention relates to novel monomers and the polymers which can be prepared from them. The resulting polymers possess excellent soil repellent properties. These polymers provide oil and water repellent finishes useful in treating materials such as textiles, paper, leather, painted wooden and metallic surfaces and the like.

The monomer compounds of the present invention are amides of certain fluorinated alkylamines and fumaric, maleic, citraconic, mesaconic and itaconic acids, and the imides formed with these fluorinated alkylamines and maleic, citraconic or itaconic acids.

The first type of monomer compounds mentioned are represented by the following formula:

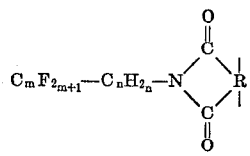

$$\left[ C_mF_{2m+1}-C_nH_{2n}-\underset{H}{N}-\underset{\parallel}{\overset{O}{C}}-R_1 \right]_2 \quad \text{I}$$

wherein $m$ is an integer of 3 to 18, preferably 6 to 10 and most preferably 7;
$n$ is an integer of 1 or 2 and preferably 1; and
$R_1$ is an ethylenically unsaturated radical derived from fumaric, maleic, citraconic, mesaconic, and itaconic acid, and preferably itaconic.

The second type of monomer compounds are represented by the following formula:

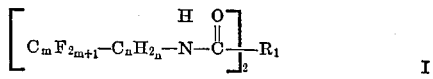

II wherein $m$ is an integer of 3 to 18, preferably 6 to 10 and most preferably 7;
$n$ is an integer of 1 or 2 and preferably 1; and
R is an ethylenically unsaturated radical derived from maleic, citraconic or itaconic acids.

The corresponding polymers of the monomers of this invention are those having skeletal chains comprising repeating units of

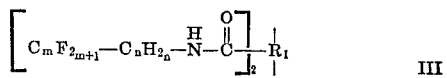

III and

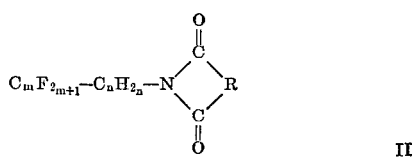

IV respectively, wherein $m$, $n$, $R_1$, and R are as defined above.

As indicated in the foregoing formulae, perfluoro groups of 3 to 18 carbon atoms may be employed and it is to be understood that mixtures of compounds of perfluoro groups of different numbers of carbon atoms within the foregoing range can be employed. Both straight and branched chain perfluoro groups are contemplated. For facility in polymerization, in general, the imides of Formula II are the preferred compounds of the present invention since the amides are more difficult to polymerize by solution or emulsion polymerization techniques. In contrast, however, as will be observed in the following examples, the amides generally have somewhat better repellency values than the imides. Based on an overall consideration of these and other factors, in general, the most preferred class of monomers and polymers of this invention are the maleimides.

The monomer compounds of Formula I and Formula II may be prepared by procedures well known to those skilled in the art. In both instances, the fluorinated alkylamines employed as a starting material are either commercially available or may be prepared by known procedures such as those described in British Pat. No. 689,425 or British Pat. No. 717,322.

For example, in the case of the amide compounds, the amine may generally be reacted with the corresponding acid chloride to yield the desired amide. In the case of the imides, the amine is reacted with the anhydride of maleic, citraconic or itaconic acid to yield the desired imide.

The polymers contemplated by the present invention include homopolymers of the novel fluoromonomers, copolymers with other ethylenically unsaturated monomers, and physical blends of such homopolymers and copolymers together and/or with other polymers.

Since the novel homopolymers and copolymers find substantial use as textile finishes, it is often desirable to include in the monomer mixture from about 0.2 to about 5% by weight of a reactive acrylic, which permits crosslinking either by heat or crosslinking agents. Such reactive fluorocopolymers give textile finishes with superior resistance to washing, dry cleaning, scrubbing, abrasion, and crushing, both wet and dry, and also a better durability of the oil and water repellency properties.

It is also advantageous, especially in the preparation of fabric finishes, to use blends of emulsions or solutions of other polymers such as polyalkyl acrylates and polyalkyl methacrylates, illustrative of which is poly (n-octyl methacrylate). Such blends serve both to substantially reduce the amount of required fluorinated polymer to achieve commercially acceptable repellency characteristics and to impart a softer finish to the fabric than if the more brittle fluorinated polymers were used alone.

Polymerization of the monomers may be carried out in bulk, solution, or emulsion. The preferred polymerization techniques are emulsion polymerization in an aqueous medium and solution polymerization. The polymerization temperature will vary depending upon the catalyst chosen.

In emulsion polymerization, the monomer or monomers to be polymerized are emulsified preferably together with a solvent such as acetone in a water solution of a surface active agent to a given monomer concentration of from about 5% to about 50%. Usually the temperature is raised to between 70–100° to effect polymerization in the presence of an added catalyst. A suitable catalyst may be any one of the commonly known water soluble agents for initiating the polymerization of an ethylenically unsaturated compound. The concentration of the catalyst for the polymerization is usually between 0.1% and 2% based upon the weight of the monomers.

Suitable surfactants or emulsifying agents include cationic, anionic or non-ionic types. Since the cationic types can be used in most textile treating baths, they are preferred. The hydrophobic portion of the surfactant may be hydrocarbon or fluorinated hydrocarbon.

Suitable surfactants that may be used include, for example, non-ionic surfactants in which the hydrophilic group is a poly(ethoxy) group and the hydrophobic portion is either a hydrocarbon or a fluorocarbon group such as the ethylene oxide condensates of alkyl phenols, alkanols, alkylamines, alkylthiols, alkylcarboxylic acids, fluoroalkyl carboxylic acids, fluoroalkyl amides and the like.

Suitable cationic surfactants include for example quaternary ammonium salts or amine salts containing at least one long chain alkyl, fluoroalkyl, or high alkyl substituted benzene or naphthalene group to provide the hydrophobic portion.

Polymerization is preferably carried out for a reaction period adjusted to obtain essentially quantitative conversion of the fluorinated monomer. The optimum reaction time will depend upon the catalyst used and the polymerization temperature and other conditions, but will generally be in the range of from 0.5 to 24 hours.

The polymerization is generally most conveniently and preferably carried out at atmospheric pressure wherever possible.

In solution polymerization, the monomer or monomers are dissolved in a suitable solvent such as fluorinated solvents, for example, fluorohalogenated hydrocarbons, hexafluoroxylene, trifluorotoluene or mixtures thereof with acetone and/or ethyl acetate, other fluorinated solvents and the like, and then polymerized in a reaction vessel using initiators such as azobisisobutyronitrile, benzoyl peroxide, or t-butyl perbenzoate, at concentrations of 0.1 to 2.0% at 70–140° C., under nitrogen.

As mentioned, besides homopolymers, valuable copolymers are obtained by polymerization of the foregoing novel perfluorinated monomers with other polymerizable monomers having ethylene unsaturation.

As a general rule, the preferred comonomer units should have short side chains, since the comonomers with longer side chains generally tend to decrease the soil repellency level.

Examples of suitable comonomers are alkyl vinylethers, such as methyl vinyl ether, isopropyl vinyl ether, isobutyl vinyl ether, 2-methoxyethyl vinyl ether, n-propyl vinyl ether, t-butyl vinyl ether, isoamyl vinyl ether, n-hexyl vinyl ether, 2-ethylbutyl vinyl ether, diisopropylmethyl vinyl ether, 1-methylheptyl vinyl ether, n-decyl vinyl ether, n-tetradecyl vinyl ether, and n-octadecyl vinyl ether.

Vinyl comonomers with short side chains are preferred. Of these vinyl ethers, the most preferred ones are: methyl vinyl ether, ethyl vinyl ether, n-propylvinyl ether, isopropyl vinyl ether, 2-methoxyethyl vinyl ether and 2-chloroethyl vinyl ether.

Propylene, butylene and isobutylene are preferred $\alpha$-olefins useful as comonomers with the novel fluoro monomers of the present invention. Especially preferred is isobutylene. Straight and branched chain $\alpha$-olefins are useful with up to 18 carbon atoms in the side chain.

Useful copolymers of the novel perfluorinated compounds of the invention are formed with vinyl esters, e.g. vinyl acetate, vinyl esters of substituted acids, such as for example, vinyl methoxyacetate, vinyl trimethylacetate, vinyl isobutyrate, isopropenyl butyrate, vinyl lactate, vinyl caprylate, vinyl pelargonate, vinyl myristate, vinyl oleate and vinyl linoleate; vinyl esters of aromatic acids, such as vinyl benzoate, and vinyl alkoxybenzoates.

Preferred of the foregoing vinyl esters are vinyl acetate, vinyl propionate, vinyl benzoate, and isopropenyl acetate.

Also useful as comonomers are styrene and related monomers which copolymerize readily with the novel esters of this invention such as o-methylstyrene, p-methylstyrene, 3,4-dimethylstyrene, 2,4,6-trimethylstyrene, m-ethylstyrene, 2,5-diethylstyrene.

Additional useful comonomers are ethylene, and chloro-, fluoro- and cyano-derivatives of ethylene such as vinyl chloride, vinylidene chloride, vinyl fluoride, vinylidene fluoride, acrylonitrile, methacrylonitrile, tetrafluoroethylene, trifluorochloroethylene, hexafluoropropylene; acrylate and methacrylate monomers, particularly those with 1 to 18 carbon atoms in the ester groups such as n-propyl methacrylate, methyl methacrylate, t-butyl methacrylate, n-butyl methacrylate, methyl acrylate, ethyl acrylate, propyl acrylate, butyl acrylate, octyl acrylate, tetradecyl acrylate, s-butyl acrylate, 2-ethylhexyl acrylate, 2-methoxyethyl acrylate, and phenyl acrylate; dienes particularly 1,3-butadiene, isoprene, and chloroprene, 2-fluoro-butadiene, 1,1,3-trifluorobutadiene, 1,1,2,3-tetrafluoro butadiene, 1,1,2-tri-fluoro-3,4-dichloro-butadiene, and tri- and pentafluoro butadiene and isoprene; nitrogenvinyl monomers such as vinyl pyridine, N-vinylimides, amides, and secondary cyclic amines, like vinyl succinimide, vinyl pyrrolidone, N-vinyl carbazole and the like.

Also useful as comonomers with the novel monomers of the present invention are vinyl monomers which contain perfluorinated side chains. Examples of such perfluorinated monomers are vinyl ethers of the type disclosed in U.S. 2,732,370 and U.S. 2,828,025; vinyl esters containing fluorinated alkyl groups disclosed in U.S. 2,592,069 and U.S. 2,436,144. Other useful monomers are acrylates and methacrylates and derivatives thereof such as those disclosed in U.S. 2,628,958; U.S. 3,256,230; U.S. 2,839,513; U.S. 3,282,905; U.S. 3,252,932 and U.S. 3,304,278.

As mentioned, it may also be desirable to include a minor amount of other reactive comonomers in order to improve the wash and dry-clean properties of the novel textile finishes obtained according to the practice of this invention. Such monomers act as cross-linking agents during the curing operation. Such reactive comonomers are generally employed in amounts of 0.1 to 2%. By way of illustration, reactive monomers which may be included are: acrylic acid, methacrylic acid, acrylamide, methacrylamide, N-methylolacrylamide, 2-hydroxyethyl methacrylate or acrylate, hydroxypropyl acrylate or methacrylate, and t-butylaminoethyl methacrylate or glycidyl methylate. Of the foregoing, N-methylolacrylamide and 2-hydroxyethyl methacrylate are preferred.

Coatings of the homopolymers and copolymers according to the present invention can be prepared and applied from solvent solutions or from aqueous emulsions. Suitable solvents are fluoroalkanes, fluorochloroalkanes, fluoroalkyl-substituted aromatics, alkyl esters of perfluoroalkanoic acids, chlorinated alkanes or aromatics, hydrocarbon aromatics, ketones, esters, and ethers. Especially useful as solvents are the fluorinated liquids, and especially $\alpha,\alpha,\alpha$-trifluorotoluene, otherwise known as benzotrifluoride, hexafluoroxylene and mixtures of these with ethyl acetate or acetone and the like. Concentrations of the fluorinated polymers of the present invention in solvents to provide coatings with effective oil and water repellency properties will generally be of the order of 0.01 to 10% and preferably from 0.1 to 2.0% by weight.

As indicated, blends of the emulsions of the polymers of this invention with blended emulsions of other polymers and copolymers are particularly useful in textile finishes.

Non-fluorinated polymers useful in such blends, include for example, but without limitation, polymers and copolymers of alkyl acrylates and alkyl methacrylates, such as methyl methacrylate, ethyl methacrylate, hexyl methacrylate, and n-octyl methacrylate. A particularly suitable polymer is poly (n-octyl methacrylate).

Also useful are polymers and copolymers of acrylic acid, methacrylic acid, styrene, alkyl styrene, butadiene, 2-methyl-1,3-butadiene, 2-chloro - 1,3 - butadiene; polymers and copolymers of vinyl esters such as vinyl acetate, vinyl butyrate, vinyl laurate, vinyl stearate, vinyl 2-ethylhexanoate; polymers and copolymers of vinyl halides and vinylidene halides, such as vinyl chloride, vinylidene chloride, vinyl fluoride, vinylidene fluoride; polymers and copolymers of allyl esters such as allyl propionate, or allyl caprylate; polymers and copolymers of vinyl ketones, such as vinyl methyl ketone, vinyl ethyl ketone, and the like; polymers and copolymers of vinyl ethers such as methyl vinyl ether, cetyl vinyl ether, and the like; polymers and copolymers of acrylamide, methacrylamide, N-methylol acrylamide, N-methylol methacrylamide, N-isopropyl acrylamide, and acrylonitrile and methacrylonitrile.

For example, from about 20 to 97% by weight of a homopolymer of poly(n-octyl methacrylate) blended with the polymers of this invention provides very useful coating compositions which retain surprisingly high repellency ratings even though the relative amount of perfluorinated polymer of this invention is relatively low. Of course, it is understood that besides application to textiles, the coatings of the perfluorinated polymers of the present invention are useful in providing oil and water repellent coatings for leather, paper, wood, masonry, metals, plastics, glass, painted surfaces, and the like. Coatings may be readily applied by various coating techniques familiar to the art, such as dipping, spraying, brushing, padding, roll coating, and the like.

For evaluation purposes, the textile material in the following examples was dipped in the bath comprising the polymer to be evaluated and the amount of the retained solution adjusted so as to leave approximately 2% of polymer by weight of the fabric on the fabric. The fabric is dried at room temperature and then cured in an oven at a temperature of about 175° C. for about 2 minutes.

The type of textile material which is coated is not critical. For evaluation purposes, repellency ratings for cotton or wool are determined as a standard screening procedure; however, such fibers such as fiberglass, silk, regenerated cellulose, cellulose esters and ethers, polyamides, polyesters, polyacrylonitrile, polyacrylates and other fibers alone or blended or in combination may be coated with the polymers of the present invention.

In the examples below, the repellency ratings were determined as follows:

The AATCC water spray test rating was determined according to Standard Test method 22–1966 of the American Association of Textile Chemists and Colorists, XXXVII, 1961, p. 1952 (also designated ASTM-D 583–58).

Oil repellency is measured by the 3-M-Oil test procedure of Grajek and Peterson, Textile Research Journal, April 1962, p. 323.

The cotton/polyester fabric referred to in the evaluations in a 65% polyester-35% cotton blend. The polyester is one formed from ethylene glycol and terephthalic acid, sold for example under the Dacron trademark.

The following examples describing certain representative embodiments of this invention will serve to further illustrate the nature of this invention. Unless otherwise specified, the relationship of parts by weight to parts by volume is that of grams to cubic centimeters, and temperatures are degrees centigrade.

EXAMPLE 1

1,1-dihydroperfluorooctylamine

To a refluxing 20% solution of 79.4 g. (0.559 mole) diisobutylaluminum hydride in toluene, there is added dropwise 105 g. (0.266 mole) of perfluorooctanonitrile. After the addition is complete, the reaction mixture is refluxed for 4 hours, cooled to 3° C. and 25 ml. of methanol added dropwise. The reaction mixture is then poured into 800 ml. 2 N hydrochloric acid and ice. The acidic water layer is separated, neutralized with a potassium hydroxide solution and the 1,1-dihydroperfluorooctylamine extracted with ether. The ether extract is dried over sodium sulfate and the ether evaporated. The crude amine is purified by distillation. There is obtained 77.9 g. (73.5%) of a colorless liquid, boiling point 75° C. at 40 mm. Hg pressure.

EXAMPLE 2

N-1,1-dihydroperfluorooctylmaleimide

To 0.1 mole of maleic anhydride in 60 ml. anhydrous ether at 10° C., there is slowly added 0.1 mole of 1,1-dihydroperfluorooctylamine. The reaction mixture is then stirred for three hours, and the precipitate filtered and dried. The dry, white powder thus obtained is heated on a steam bath for three hours together with 28 g. of anhydrous sodium acetate. The reaction mixture is cooled and then poured into 1000 ml. of water. The white precipitate formed is filtered, washed and dried and sublimed at 100° C. and 0.1 mm. Hg pressure. The sublimed powder is dissolved in chloroform, filtered, and recrystallized from benzene, melting at 70–70.5° C.

*Analysis.* — Calcd. for $C_{12}H_4F_{15}NO_2$ (percent): C, 30.08; H, 0.84; F, 59.48. Found (percent): C, 30.09; H, 1.00; F, 59.22.

EXAMPLE 3

N-1,1-dihydroperfluorooctylcitraconimide

The procedure employed in the foregoing Example 2 is repeated but employing an equivalent amount of citraconic anhydride in the place of the maleic anhydride and there is obtained N-1,1-dihydroperfluorooctylcitraconimide, melting at 78–79° C. after recrystallization from benzene.

*Analysis.* — Calcd. for $C_{13}H_5F_{15}NO_2$ (percent): C, 31.66; H, 1.23; F, 57.78. Found (percent): C, 31.93; H, 1.44; F, 57.66.

EXAMPLE 4

Bis(N-1,1-dihydroperfluorooctyl)fumaramide 0.1 mole of fumaryl chloride is added slowly to a solution of 0.4 mole of 1,1-dihydroperfluorooctylamine in 700 g. of trifluorotoluene at 6° C. A white precipitate is formed immediately. The amine hydrochloride is separated from the product by sublimation at 100–110° C. and 0.1 mm. Hg. The remaining product is pure white, melting at 197–198° C., after recrystallization from a mixture of benzotrifluoride and ethanol. The yield is 90.8%.

*Analysis.*—Calcd. for $C_{20}H_8F_{30}N_2O_2$ (percent): C, 27.35; H, 0.92; F, 64.90. Found (percent): C, 27.23; H, 0.95; F, 65.18.

EXAMPLE 5

Bis(N-1,1-dihydroperfluorooctyl)itaconamide 0.1 mole of itaconyl chloride is added slowly to a solution of 0.4 mole of 1,1-dihydroperfluorooctylamine in 700 g. of trifluorotoluene at 6° C. A white precipitate forms immediately. The amine hydrochloride is separated from the product by sublimation at 100–110° C. and 0.1 mm. Hg. The remaining product is a pure white powder with a melting point of 142–143° C. after recrystallization from methanol. Yield: 56.3%.

*Analysis.*—Calcd. for $C_{21}H_{10}F_{30}N_2O_2$ (percent): C, 28.26; H, 1.13; F, 63.88. Found (percent): C, 28.15; H, 1.12; F, 64.14.

EXAMPLE 6

Following the general methods described above and employing stoichiometrically equivalent amounts of the appropriate starting materials, the following compounds of Formula I are obtained.

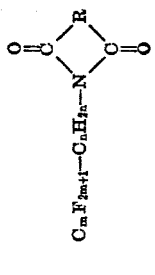

| $C_mF_{2m+1}$ | n | $R_1$—Derived from— |
|---|---|---|
| a...... $CF_3CF_2CF_2$ | 1 | Mesaconic acid. |
| b...... $CF_3(CF_2)_4$ | 2 | Fumaric acid. |
| c...... $CF_3(CF_2)_{11}$ | 2 | Itaconic acid. |
| d...... $CF_3(CF_2)_{11}$ | 1 | Citraconic acid. |

EXAMPLE 7

Likewise, the following compounds of Formula II are prepared according to the foregoing methods using appropriate starting material:

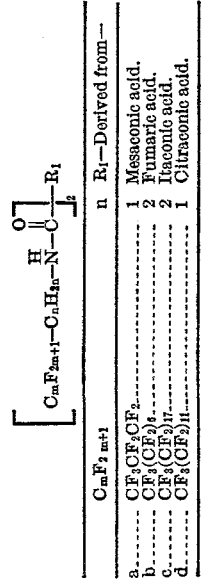

| $C_mF_{2m+1}$ | n | R—Derived from— |
|---|---|---|
| a...... $CF_3CF_2CF_2$ | 2 | Citraconic acid. |
| b...... $CF_3(CF_2)_2$ | 1 | Itaconic acid. |
| c...... $(CF_3)_2CF[CF_2CF(CF_3)]_2$ | 1 | Maleic acid. |
| d...... $(CF_3)_2CF(CF_2)_{15}$ | 2 | Maleic acid. |

(except in the case of Example 8 which concerns a homopolymer), 2 parts of azobisisobutyronitrile, and 200 parts of hexafluoroxylene are sealed under nitrogen in ampuls and polymerized for 16 hours at 70–80° C. A 5% solution of the resulting polymer in hexafluoroxylene is precipitated into 20 times the amount of methanol. The precipitated polymer powder is filtered, washed and dried. Yields in every case exceeded 80%. Characteristics of the polymers are listed in Table I.

The polymers are applied to test fabrics of wool, cotton, and cotton/polyester from a 2% hexafluoroxylene solution. In several cases as shown in Table I, a 2% solution of a blend of 40% copolymer and 60% poly(n-octyl methacrylate) in hexafluoroxylene is employed.

The repellency ratings are then determined using the tests described above and the results are also shown in Table I.

EXAMPLES 8–21

In each of these examples, 100 parts of a mixture of equimolar amounts of the fluorinated monomer of Example 2, and a comonomer as listed in following Table I

TABLE I

| Example No. | Co-monomer | Repellency (2% polymer on fabric) Fabric | 3-M-oil test | AATCC H₂O test | Appearance | Differential thermal analysis $T_g$ (°C.) | $T_m$ (°C.) | Elemental analysis Calcd. C | H | F | N | Found C | H | F | N |
|---|---|---|---|---|---|---|---|---|---|---|---|---|---|---|---|
| 8 | None—(homopolymer) | C | 100(100) | 80(80) | Brittle powder, sl. orange | Not dist. | Not dist. | 30.08 | 0.84 | 59.48 | ...... | 30.32 | 1.05 | 59.51 | ...... |
| 9 | $CH_2$=CHOCH₃ | W | 110(100) | 80(80) | Brittle, white | do | +140 | 33.53 | 1.88 | 2.61 | ...... | 33.49 | 2.03 | 2.69 | ...... |
|   |   | C/D | 110(100) | 80(80) |   |   |   |   |   |   |   |   |   |   |   |
|   |   | C | 100(90) | 80(80) |   |   |   |   |   |   |   |   |   |   |   |
| 10 | $CH_2$=CHOCH₂CH₃ | W | 100(110) | 80 | do | do | +134 | 34.86 | 2.19 | ...... | ...... | 33.80 | 1.90 | ...... | ...... |
| 11 | $CH_2$=CHOCH₂CH(CH₃)₂ | C | 80 | 90 | do | do | +103 | 41.58 | 3.81 | ...... | ...... | 40.15 | 3.18 | ...... | ...... |
|   |   | W | 60 | 70 |   |   |   |   |   |   |   |   |   |   |   |
| 12 | $CH_2$=CHO(CH₂)₃CH(CH₃)₂ | C | 80 | 80 | Soft, white | do | Not dist. | 35.15 | 2.43 | ...... | ...... | 34.38 | 1.98 | ...... | ...... |
|   |   | W | 60 | 80 |   |   |   |   |   |   |   |   |   |   |   |
| 13 | $CH_2$=CHOCH₂CH₂OCH₃ | C | 80 | 70 | Brittle, white | +14 | +46 | 38.53 | 3.23 | ...... | ...... | 37.86 | 2.97 | ...... | ...... |
|   |   | W | 110 | 70 |   |   |   |   |   |   |   |   |   |   |   |
| 14 | $CH_2$=CHOCH₂CH₂O(CH₂)₃CH₃ | C | 70 | 70 | do | Not dist. | Not dist. |   |   |   |   |   |   |   |   |
|   |   | W | 90 | 90 |   |   |   |   |   |   |   |   |   |   |   |
| 15 | $CH_2$=CHOCH₂CH₂Cl | C | 80 | 80 | do | +40 | do | 32.81 | 1.89 | ...... | ...... | 32.58 | 1.69 | ...... | ...... |
|   |   | W | 80 | 80 |   |   |   |   |   |   |   |   |   |   |   |
| 16 | $CH_2$=CHOCH₂CF₃ | C | 70 | 80 | do | Not dist. | do | 31.75 | 1.50 | 2.31 | ...... | 31.50 | 1.41 | 2.41 | ...... |
|   |   | W | 90 | 80 |   |   |   |   |   |   |   |   |   |   |   |
| 17 | $CH_2$=C(CH₃)₂ | C | 110 | 80 | do | do | do | 35.90 | 2.26 | 2.62 | ...... | 35.68 | 2.01 | 3.17 | ...... |
|   |   | C/D | 100 |   |   |   |   |   |   |   |   |   |   |   |   |
| 18 | $CH_2$=CHN(COCH₃)(CH₂CH₃)₂ (as drawn) | C | 70 | 70 | do | do | +160 | 36.62 | 2.22 | ...... | ...... | 35.87 | 2.37 | ...... | ...... |
|   |   | C/D | 70 | 70 |   |   |   |   |   |   |   |   |   |   |   |
| 19 | $CH_2$=OHC₆H₅ | C | 80 | 90 | do | do | +180 | 35.68 | 1.05 | 2.08 | ...... | 35.95 | 2.55 | 2.52 | ...... |
|   |   | W | 90 | 90 |   |   |   |   |   |   |   |   |   |   |   |
| 20 | $CH_2$=CHOOC₇F₁₅ | C | 70 | 70 | do | do | Not dist. | 28.74 | 0.77 | ...... | ...... | 29.63 | 0.97 | ...... | ...... |
|   |   | W | 90 | 80 |   |   |   |   |   |   |   |   |   |   |   |
| 21 | $CH_2$=C(CH₃)COOCH₂C₇F₁₅ | C | 110 | 120 | do | do | do | 29.53 | 1.19 | 1.50 | ...... | 30.60 | 1.21 | 1.71 | ...... |
|   |   | W | 110 | 80 |   |   |   |   |   |   |   |   |   |   |   |
|   |   | C/D | 110 |   |   |   |   |   |   |   |   |   |   |   |   |

NOTE.—The ratings indicated in parentheses are obtained employing a blend of 40% homopolymer and 60% poly(n-octyl methacrylate).

EXAMPLES 22-25

Following the procedures described for Examples 8-21, the fluorinated monomer of Example 3 and the comonomers listed in Table II are polymerized together resulting in at least 80% yields of copolymers having the characteristics shown in Table II.

The polymers are applied to test fabrics as above from 2% hexafluoroxylene solutions. The repellency ratings obtained are shown in Table II.

EXAMPLES 29-32

In each of these examples, 100 parts of an equimolar mixture of the fluorinated monomer of Example 5, and a comonomer as listed in the following Table IV, 2 parts of t-butylperbenzoate and 500 parts of a 1/1 mixture of hexafluoroxylene-ethyl acetate are sealed under nitrogen in ampuls and polymerized for 16 hours at 120-130° C. In each case, a 5% solution of the resulting polymer in a hexafluoroxylene-ethyl acetate mixture (1/1) is pre-

TABLE II

| Example No. | Co-monomer | Repellency (2% polymer on fabric) | | | Appearance | Differential thermal analysis | | Elemental analysis | | | |
|---|---|---|---|---|---|---|---|---|---|---|---|
| | | Fabric | 3-M-oil test | AATCC $H_2O$ test | | $T_g$ (° C.) | $T_m$ (° C.) | Calcd. C | H | Found C | H |
| 22 | $CH_2=CHOCH_3$ | C / W / C/D | 70 / 90 / 70 | 70 / / 70 | White, brittle | | | 34.86 | 2.19 | 34.85 | 2.03 |
| 23 | $CH_2=CHOCOCH_3$ | C / W / C/D | 70 / 80 / 70 | 70 / / 70 | do | Not dist | +110 | 35.25 | 2.09 | 34.87 | 2.21 |
| 24 | $CH_2=CH-C_6H_5$ | C / W / C/D | 60 / 60 / 50 | 70 / / 70 | do | do | +126 | 42.22 | 2.36 | 42.99 | 2.51 |
| 25 | $CH_2=CH-N\begin{smallmatrix}CO-CH_2\\ \\CH_2-CH_2\end{smallmatrix}$ | C / W / C/D | 50 / / 50 | 70 / / 70 | do | do | +168 | 37.76 | 2.50 | 38.30 | 2.64 |

EXAMPLES 26-28

In each of these examples, 100 parts of an equimolar mixture of the fluorinated monomer of Example 4, and a comonomer as listed in the following Table III, 2 parts of t-bultylperbenzoate and 500 parts of a 1/1 mixture of hexafluoroxylene-ethyl acetate are sealed under nitrogen in ampuls and polymerized for 16 hours at 120-130° C. In each case, a 5% solution of the resulting polymer in a hexafluoroxylene-ethyl acetate mixture (1/1) is precipicipitated into 20 times the amount of methanol. Yields of polymers having the characteristics as listed in Table IV in each case exceed 75%. Polymers are applied to test fabrics of wool, cotton and cotton/polyester from a 2% hexafluoroxylene solution. As indicated in Table IV, in some cases a 2% solution of a blend of 40% copolymer and 60% poly(n-octyl methacrylate) in hexafluoroxylene is employed. Results of repellency tests are likewise shown in Table IV.

TABLE IV

| Example No. | Co-monomer | Repellency (2% polymer on fabric) | | | Appearance | Differential thermal analysis | | Elemental analysis | | | |
|---|---|---|---|---|---|---|---|---|---|---|---|
| | | Fabric | 3-M-oil test | AATCC $H_2O$ Test | | $T_g$ (° C.) | $T_m$ (° C.) | Calcd. C | H | Found C | H |
| 29 | $CH_2=CHOCH_3$ | C / W / C/D | 110(110) / 110(100) / 110(100) | 70(70) / / 70(70) | Powder, white | Not dist | +113 | 30.33 | 1.70 | 29.65 | 1.39 |
| 30 | $CH_2=CHOCH_2CH_2OCH_3$ | C / W / C/D | 120(100) / 130(110) / 120(100) | 70(70) / / 70(70) | do | do | +94 | 31.40 | 2.03 | 29.78 | 1.40 |
| 31 | $CH_2=CHOCOCH_3$ | C / W / C/D | 110(100) / 110(120) / 110(110) | 50(70) / / 70(70) | do | do | +108 | 30.69 | 1.65 | 27.96 | 1.23 |
| 32 | $CH_2=CHC_6H_5$ | C / W / C/D | 90(90) / 80(70) / 90(80) | 50(70) / / 70(70) | do | | | 34.95 | 1.82 | 32.72 | 1.65 |

NOTE.—The ratings indicated in parentheses are obtained employing a blend of 40% homopolymer and 60% poly(n-octyl methacrylate).

EXAMPLES 33-36

In Examples 33-36, 2% solutions of the copolymer of N - 1,1 - dihydroperfluorooctylmaleimide and methyl vinyl ether of Example 9 are blended with poly(n-octyl methacrylate) in the ratios shown in the following Table V, and the blends applied to test fabrics as in the foregoing examples and the repellency ratings determined. The results are as indicated in Table V.

TABLE III

| Example No. | Co-monomer | Repellency (2% polymer on fabric) | | | Appearance | Differential thermal analysis | | Elemental analysis | | | |
|---|---|---|---|---|---|---|---|---|---|---|---|
| | | Fabric | 3-M-oil test | AATCC $H_2O$ Test | | $T_g$ (° C.) | $T_m$ (° C.) | Calcd. C | H | Found C | H |
| 26 | $CH_2=CHOCH_3$ | C / W / C/D | 80(80) / 110(120) / 80(100) | 70(70) / / 80(70) | Powder, white | Not dist | Not dist | 29.50 | 1.51 | 28.75 | 1.26 |
| 27 | $CH_2=CHOCOCH_3$ | C / W / C/D | 100(90) / 90(100) / 100(100) | 70(70) / / 70(70) | do | do | +155 | 29.89 | 1.46 | 28.85 | 1.44 |
| 28 | $CH_2=CHC_6H_5$ | C / W / C/D | 100(90) / 100(100) / 90(90) | 70(70) / / 70(70) | do | do | +213 | 34.23 | 1.64 | 34.82 | 1.96 |

NOTE.—The ratings indicated in parenthesis are obtained employing a blend of 40% homopolymer and 60% poly(n-octyl methacrylate).

TABLE V

| Example No. | Copolymer of Example 9 | Poly(n-octyl methacrylate) | Fabric | Repellency 3-M-oil test | AATCC H₂O test |
|---|---|---|---|---|---|
| 33 | 40 | 60 | C | 90 | 80 |
|   |    |    | W | 110 | 80 |
|   |    |    | C/D | 90 | 80 |
| 34 | 20 | 80 | C | 90 |    |
|   |    |    | W | 90 | 80 |
|   |    |    | C/D | 90 | 70 |
| 35 | 10 | 90 | C | 90 |    |
|   |    |    | W | 90 | 70 |
|   |    |    | C/D | 80 | 70 |
| 36 | 5 | 95 | C | 90 |    |
|   |    |    | W | 90 | 70 |
|   |    |    | C/D | 90 | 70 |

EXAMPLES 37-40

In Examples 37-40, 2% solutions of the copolymer of bis (N - 1,1 - dihydroperfluorooctyl)itaconamide and methyl vinyl ether of Example 29 are blended with poly (n-octyl methacrylate) in the ratios shown in the following Table VI, and the blends applied to test fabrics as in the foregoing examples and the repellency ratings determined. The results are as indicated in Table VI

TABLE VI

| Example No. | Copolymer of Example 29 | Poly(n-octyl methacrylate) | Fabric | Repellency 3-M-oil test | AATCC H₂O test |
|---|---|---|---|---|---|
| 37 | 40 | 60 | C | 110 | 70 |
|   |    |    | W | 110 |    |
|   |    |    | C/D | 110 | 70 |
| 38 | 20 | 80 | C | 100 | 70 |
|   |    |    | W | 100 |    |
|   |    |    | C/D | 100 | 70 |
| 39 | 10 | 90 | C | 100 | 70 |
|   |    |    | W | 110 |    |
|   |    |    | C/D | 100 | 70 |
| 40 | 5 | 95 | C | 90 | 70 |
|   |    |    | W | 100 |    |
|   |    |    | C/D | 100 | 70 |

What is claimed is:

1. A compound of the formula:

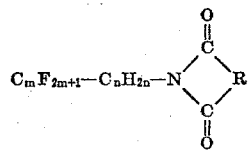

wherein $m$ is an integer of 3 to 18; $n$ is an integer of 1 or 2; and R is an ethylenically unsaturated radical of maleic acid of the formula —CH=CH—, citraconic acid of the formula —C(CH₃)=CH—, or itaconic acid of the formula

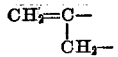

2. A compound as claimed in claim 2 wherein $m$ is 6 to 10.
3. A compound as claimed in claim 2 wherein R is derived from maleic acid.
4. A compound as claimed in claim 2 which is N-1,1-dihydroperfluorooctylmaleimide.
5. A compound as claimed in claim 2 which is N-1,1-dihydroperfluorooctylcitraconimide.

References Cited
UNITED STATES PATENTS
3,337,583   8/1967   Knock _____ 260—326.3

ALTON D. ROLLINS, Primary Examiner

J. A. NARCAVAGE, Assistant Examiner

U.S. Cl. X.R.

8—115.5; 117—127, 138.5, 138.8 A, 142, 148, 155; 252—8.57, 8.75; 260—30.2, 32.6 N, 78 UA, 85.7, 88.3 R, 89.7 R, 561 N